US008064935B2

(12) United States Patent
Shamoon et al.

(10) Patent No.: US 8,064,935 B2
(45) Date of Patent: Nov. 22, 2011

(54) UBIQUITOUS CONNECTIVITY AND CONTROL SYSTEM FOR REMOTE LOCATIONS (75) Inventors: Charles G. Shamoon, Little Elm, TX (US); Deborah H. Shamoon, Little Elm, TX (US); Franklin Eugene Neal, Ashland, KY (US); Michael D. Fehnel, Fuquay-Varina, NC (US)

(73) Assignees: Charles G. Shamoon, Little Elm, TX (US); Deborah H. Shamoon, Little Elm, TX (US)

( * ) Notice: Subject to any disclaimer, the term of this patent is extended or adjusted under 35 U.S.C. 154(b) by 911 days.

(21) Appl. No.: 11/686,993

(22) Filed: Mar. 16, 2007

(65) Prior Publication Data

US 2007/0167179 A1 Jul. 19, 2007

Related U.S. Application Data (62) Division of application No. 11/163,372, filed on Oct. 17, 2005, now Pat. No. 7,257,397, which is a division of application No. 11/160,006, filed on Jun. 6, 2005, now Pat. No. 6,990,335.

(60) Provisional application No. 60/522,887, filed on Nov. 18, 2004.

(51) Int. Cl.
*H04W 4/00* (2009.01)
(52) U.S. Cl. ........ 455/466; 709/219; 709/208; 709/229; 709/243; 709/244; 455/456.6; 455/92; 455/352; 455/418; 455/414; 455/420; 455/123; 455/151.1; 455/230
(58) Field of Classification Search .................. 709/219, 709/208, 229, 243, 244; 455/456.6, 92, 352, 455/418, 414, 420, 123, 151.1, 230
See application file for complete search history.

(56) References Cited

U.S. PATENT DOCUMENTS

| | | | |
|---|---|---|---|
| 4,918,439 A | 4/1990 | Wozniak et al. |
| 4,965,557 A | 10/1990 | Schepers et al. |
| 5,109,222 A | 4/1992 | Welty |
| 5,247,580 A | 9/1993 | Kimura et al. |
| 5,544,036 A | 8/1996 | Brown, Jr. et al. |
| 5,545,857 A | 8/1996 | Lee et al. |
| 5,579,496 A | 11/1996 | Van Steenbrugge |
| 5,621,662 A | 4/1997 | Humphries et al. |
| 5,778,256 A | 7/1998 | Darbee et al. |
| 5,805,530 A | 9/1998 | Youngberg |
| 5,818,428 A | 10/1998 | Eisenbrandt et al. |
| 5,917,105 A | 6/1999 | Joao |
| 5,924,486 A | 7/1999 | Ehlers et al. |
| 6,005,490 A | 12/1999 | Higashihara |
| 6,014,089 A | 1/2000 | Tracy et al. |

(Continued)

OTHER PUBLICATIONS

Sony Ericcson Mobile Communications AB, GT47/GT48 Control Terminal "Intelligent and Versatile Control Terminal", 2 pages, LZT 123 7602 R1D, 2003.

(Continued)

*Primary Examiner* — Kamran Afshar
*Assistant Examiner* — Edward Zhang
(74) *Attorney, Agent, or Firm* — Hershkovitz & Associates, LLC; Abraham Hershkovitz (57) ABSTRACT A thermostat control system for monitoring and controlling environmental characteristics of a building includes a base station unit and a remote access unit continuously interfacing through instant wireless private direct connectivity. The system also includes a plurality of sensors that measure the environmental characteristics and provide the thermostat unit with the measurements.

22 Claims, 4 Drawing Sheets

U.S. PATENT DOCUMENTS

| | | | |
|---|---|---|---|
| 6,081,750 | A | 6/2000 | Hoffberg et al. |
| 6,104,334 | A | 8/2000 | Allport |
| 6,192,282 | B1 | 2/2001 | Smith et al. |
| 6,195,589 | B1 | 2/2001 | Ketcham |
| 6,216,956 | B1 | 4/2001 | Ehlers et al. |
| 6,260,765 | B1 | 7/2001 | Natale et al. |
| 6,264,559 | B1 | 7/2001 | Lawrence et al. |
| 6,301,481 | B1 | 10/2001 | Rogers et al. |
| 6,393,297 | B1 | 5/2002 | Song |
| 6,394,359 | B1 | 5/2002 | Morgan |
| 6,398,727 | B1 | 6/2002 | Bui et al. |
| 6,476,714 | B2 | 11/2002 | Mizuta |
| 6,650,249 | B2 | 11/2003 | Meyer et al. |
| 6,813,474 | B2 | 11/2004 | Robinson et al. |
| 6,820,049 | B1 | 11/2004 | Monroe et al. |
| 6,847,822 | B1 | 1/2005 | Dennison et al. |
| 6,854,660 | B2 | 2/2005 | Yoon et al. |
| 6,873,824 | B2 | 3/2005 | Flick |
| 6,919,790 | B2 | 7/2005 | Kanazawa |
| 6,934,862 | B2 | 8/2005 | Sharood et al. |
| 6,957,393 | B2 | 10/2005 | Fano et al. |
| 6,959,196 | B1* | 10/2005 | Yarkosky ............... 455/466 |
| 6,970,539 | B2* | 11/2005 | Yamamoto et al. ...... 379/102.05 |
| 7,005,979 | B2 | 2/2006 | Haughawout et al. |
| 7,031,663 | B2* | 4/2006 | Heinonen et al. .......... 455/67.11 |
| 7,610,113 | B2* | 10/2009 | Cocciadiferro et al. ...... 700/108 |
| 2002/0149705 | A1 | 10/2002 | Allen et al. |
| 2003/0034897 | A1* | 2/2003 | Shamoon et al. ......... 340/825.72 |
| 2003/0034898 | A1 | 2/2003 | Shamoon et al. |
| 2004/0092282 | A1* | 5/2004 | Kim et al. ................... 455/522 |
| 2004/0128033 | A1 | 7/2004 | Ku et al. |
| 2004/0235446 | A1 | 11/2004 | Flaherty et al. |
| 2004/0260406 | A1* | 12/2004 | Ljunggren et al. ............... 700/9 |
| 2005/0044225 | A1 | 2/2005 | Ota et al. |
| 2005/0079880 | A1* | 4/2005 | Donner et al. ............... 455/466 |
| 2005/0259618 | A1* | 11/2005 | Ahya et al. ................... 370/331 |

OTHER PUBLICATIONS

Sony Ericcson Mobile Communications International, GT47/GT48 Technical Desciption, 43 pages, LZT 123 7607 R1B, First Edition, Jun. 2003.

Cellgard—Use your GSM cellphone as a remote control for almost anything, "Cellgard", http://www.cellgard.com/index.html, 2 pages (Oct. 17, 2005).

Cellgard—Cellgard Technical Specifications, "Cellgard", http://www.cellgard.com/specs/index.html, 3 pages (Oct. 17, 2005).

Cellgard—Frequently Asked Questions, "Cellgard", http://www.cellgard.com/faq/index.html, 4 pages (Oct. 17, 2005).

* cited by examiner

UBIQUITOUS CONNECTIVITY AND CONTROL SYSTEM FOR REMOTE LOCATIONS

RELATED APPLICATION

This application is a divisional of U.S. application Ser. No. 11/163,372, filed Oct. 17, 2005, pending, which is a divisional of U.S. application Ser. No. 11/160,006, filed Jun. 6, 2005, now U.S. Pat. No. 6,990,335, patented on Jan. 24, 2006, which claims the benefit of U.S. Provisional Application No. 60/522,887, filed Nov. 18, 2004, in the name of Charles Shamoon and entitled "Ubiquitous Connectivity and Control System for Remote Locations".

FIELD OF THE INVENTION

The present invention relates to a remote monitoring and control system for an environment. More specifically, the system relates to on demand bidirectional communication between a remote access unit and a multifunctional base control unit in a geographically remote location.

BACKGROUND OF THE INVENTION

In addition to a main residence, modern times provide people and families with vacation homes that are geographically remote from the regular places of residence. Also, owners of businesses generally have their place of business remote from their residence. These structures tend to be affected by changes in environmental characteristics, either natural (i.e., weather conditions), or non-natural (i.e., vandalism, break-ins, etc.). Generally, a thermostat monitors the ambient temperature and regulates a heating/cooling appliance to keep the building within the predefined temperature range thereby accomplishing the typical environmental control. The typical thermostat only monitors the ambient temperatures. Where the building is in a volatile climatic region, it is not always feasible to maintain the full functions of the appliances year round. For example, a building located in a region known for very warm temperatures, if the owner resides several hundred miles away, there would be no need to activate a cooling system on an abnormally warm day during a virtually cool season. There is no system found that monitors the ambient environmental factors within a predefined range of values, upon an exception to the predefined values, alerts the remotely located owner, and allows the owner to remotely redefine the acceptable environmental parameters. Thus a remote control system solving the aforementioned problem, as well as several others, is desired.

The home control industry is a rapidly growing, multi-billion dollar industry. This growth has been accompanied by the recent development of smart appliances and efforts to development a universal protocol for home control by major companies. The present invention provides the next major development in today's home control industry, ubiquitous connectivity and control of structure environment.

The home control industry has taken steps toward ubiquitous connectivity and control over the years, but these steps have fallen short until now. The home control industry has moved from ultrasonic remote control to infrared remote control to local RF remote control and on to land-line phone home-away-from-home remote control. The advent of improved cell phone technology provided more mobility and convenience to home-away-from-home control. High-speed and wireless Internet access has allowed connectivity to the home through home-based and wireless laptop computers. While an advance in connectivity, mobile Internet connectivity, like its predecessors, is not without significant challenges, especially with mobility and convenience.

The invention of the microcontroller and microcomputer has spawned a robust industry in home automation. An endless number of systems have been created by hobbyist, commercial, and industrial developers. Processes and devices for which automation has been pioneered include audio systems, video systems, security and surveillance systems, lighting systems, watering and irrigation systems, systems for measurement of vital statistics for medical patients, and garage door openers, to name a few. The typical control architecture includes a transmitter and a receiver in which a command is issued by the transmitter and is executed in response by the receiver. Communications links have used radio frequency, infrared, and ultrasonic technologies.

Other technologies used for home automation include power line carrier and telephone line. Power line carrier and telephone line systems both have the benefit of being able to use existing facility wiring for communications. Each has its own benefits and detriments. Power line systems operate on existing building electrical wiring while telephone line systems use existing telephone wiring. Electrical wiring is usually available in more locations within a building than is telephone wiring. Telephone line systems are generally more secure.

By far the most popular and ubiquitous power line carrier system is the X10. This system use transmitter, receiver, and controller modules connected to the building wiring, usually by plugging directly into an electrical outlet. Each module is individually addressed by a companion module, which is responsive to commands issued or received that are encoded with a preset digital address. The X10 system, like most power line carrier technologies, is characteristically confined to operation within a very limited area, such as within a single building. Newer interfaces have been developed to allow control of a broad range of external communications systems with X10 systems.

The need to expand the geographic range of control for a limited system, such as power line carrier, radio frequency, or infrared, led to the development of telephone interfaces, including voice, DTMF, and Caller ID. While such systems allow users to exercise control of their facilities remotely, they are not as user friendly and often use tones or cryptic, hard-to-understand, digitized voice prompts. Often a long distance call from a pay telephone was required to access the controller, which had to be interfaced with the facility telephone network.

The availability of personal computers, the Internet, and broadband networks has fueled the explosion in the number of home automation methods and devices. Controlling software is available for Windows, Macintosh, Linux, and DOS based computers. Every imaginable type of input-output port has been used to communicate data into and out of a computer. Examples of available interfaces usable for home automation and control purposes include USB, parallel port, joystick, serial (RS-232, RS-422, RS-485 and the like), audio, ActiveX, and TCP/IP. Bidirectional communications have become more prevalent, allowing a remote operator to not only control but also to observe and monitor the tasks performed by the automation system. Internet-based utilities allow control and monitoring of systems from any computer anywhere in the world.

One of the most relevant entries into the home automation universe is the cellular telephone. In their most basic mode, cell phones can be used to control the same systems accessible by conventional telephones through the dial-up POTS network. A more advanced method involves the use of the cell phone network's short message service ("SMS") in which text messages are sent to and received from a controlled system. SMS messages travel on the same cellular network (on the same physical layer) as standard voice calls but on a different logical channel.

SUMMARY OF THE INVENTION

The present invention uses an on-demand digital, private, and direct communications interface to overcome the shortcomings and limitations of current communications interfacing. A digital, private, and direct-connect remote controller provides instant wireless connectivity to the home from anywhere in the world without dialing a number or waiting for a number of tones to send a command or to know the status of conditions in the home; provides silent and constant direct two-way communication privately and globally, with the home for control and monitoring of key functions; eliminates limitations, immobility, and inopportunities to connect, monitor and control the home, globally; can be configured to interface with many existing and future home automation systems and technologies; provides instant ubiquitous control for the end-user; and, if so desired, eliminates the need for the PC, modems and interconnected wiring.

The digital private direct connect controller allows the end-user to finally realize true global connectivity to and control of the home.

BRIEF DESCRIPTION OF THE DRAWINGS

The above features and advantages of the present invention will become apparent upon reading the following description taken in conjunction with the accompanying drawings in which.

Similar reference characters denote corresponding features consistently throughout the attached drawings.

DETAILED DESCRIPTION OF THE PREFERRED EMBODIMENTS

Figure 1:
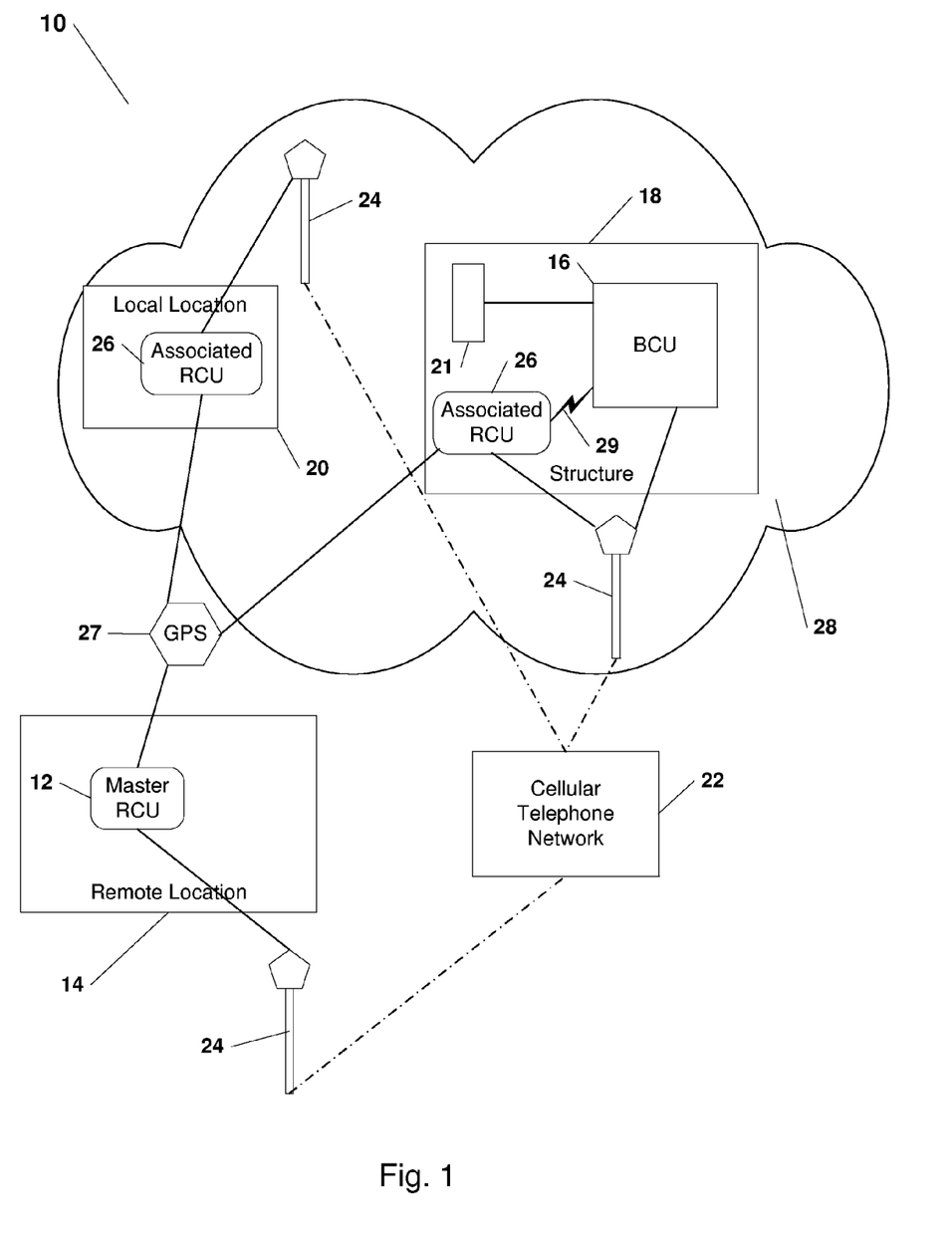
FIG. 1 is a block diagram illustrating a connectivity and control system according to an embodiment of the present invention.

Referring to the drawings, FIG. 1 illustrates a ubiquitous connectivity and control system 10 wherein a master remote control unit 12 at a geographically remote location 14 on demand interfaces with a base control unit 16 in a structure 18 to monitor and control associated devices 21 thereat through a short message and/or the data bearer cellular telephone network 22 including control towers 24. The system 10 further includes associated control units 26 that are enabled by the base control unit 16 to undertake select monitoring and controlling activities in a proximate area 28. Associated control units 26 and the master control unit 12 utilize the global position network 27 and/or the cellular telephone network 22 and towers 24 in order to determine their geographical locations 14, 20 and report this information back to the base control unit 16 using the short message and/or data bearer services of the cellular telephone network 22 and control towers 24.

Figure 2:
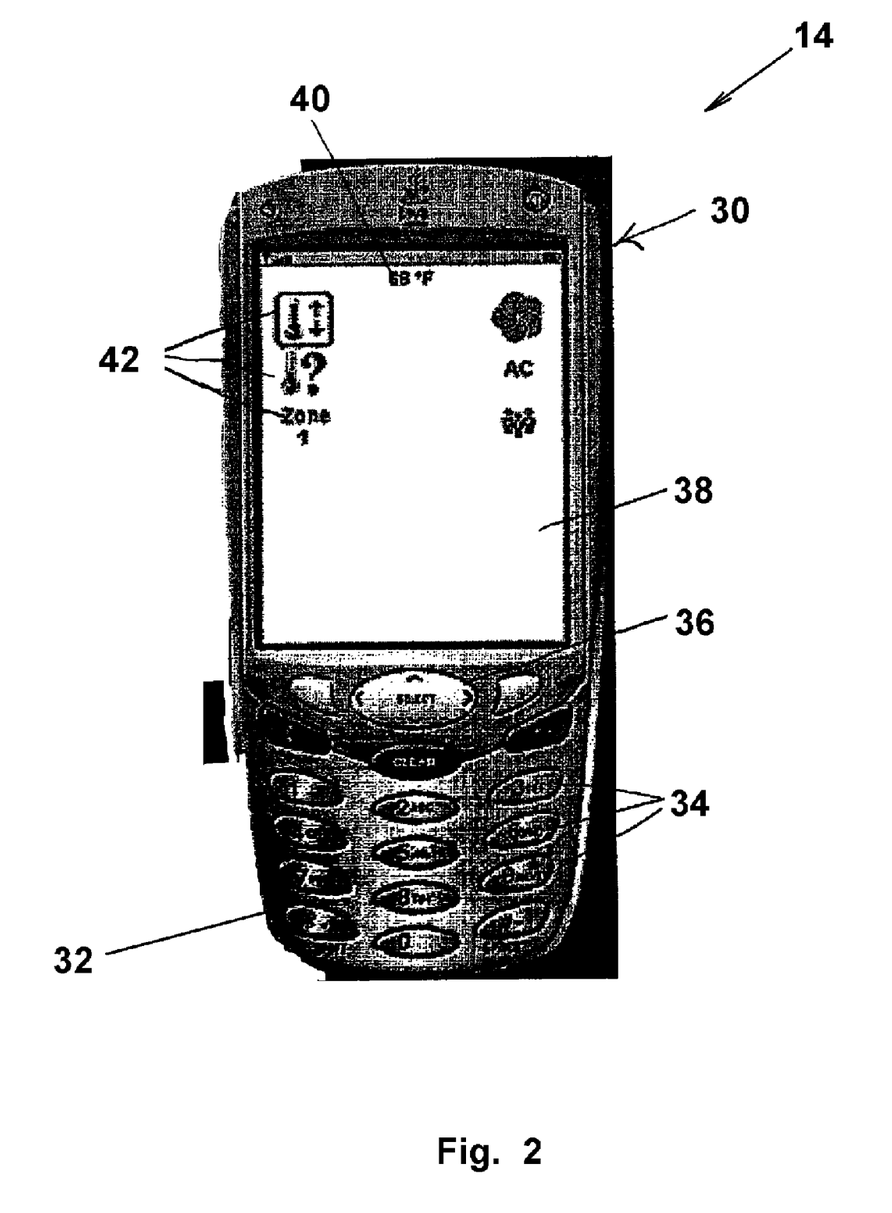
FIG. 2 is a block diagram of the remote control unit of the system of FIG. 1.

Referring to FIG. 2, the master remote control unit 12 and associated remote control units 26 are Java/J2ME enable cellular telephones 30 having a keypad 32 with a plurality of keys 34 including a select button 36, and an LCD display 38 for displaying textual information 40 and graphical icons 42 responsive to commands received from the base control unit 16 or from other control units configured through base control unit 16 to work with system 10.

Figure 3:
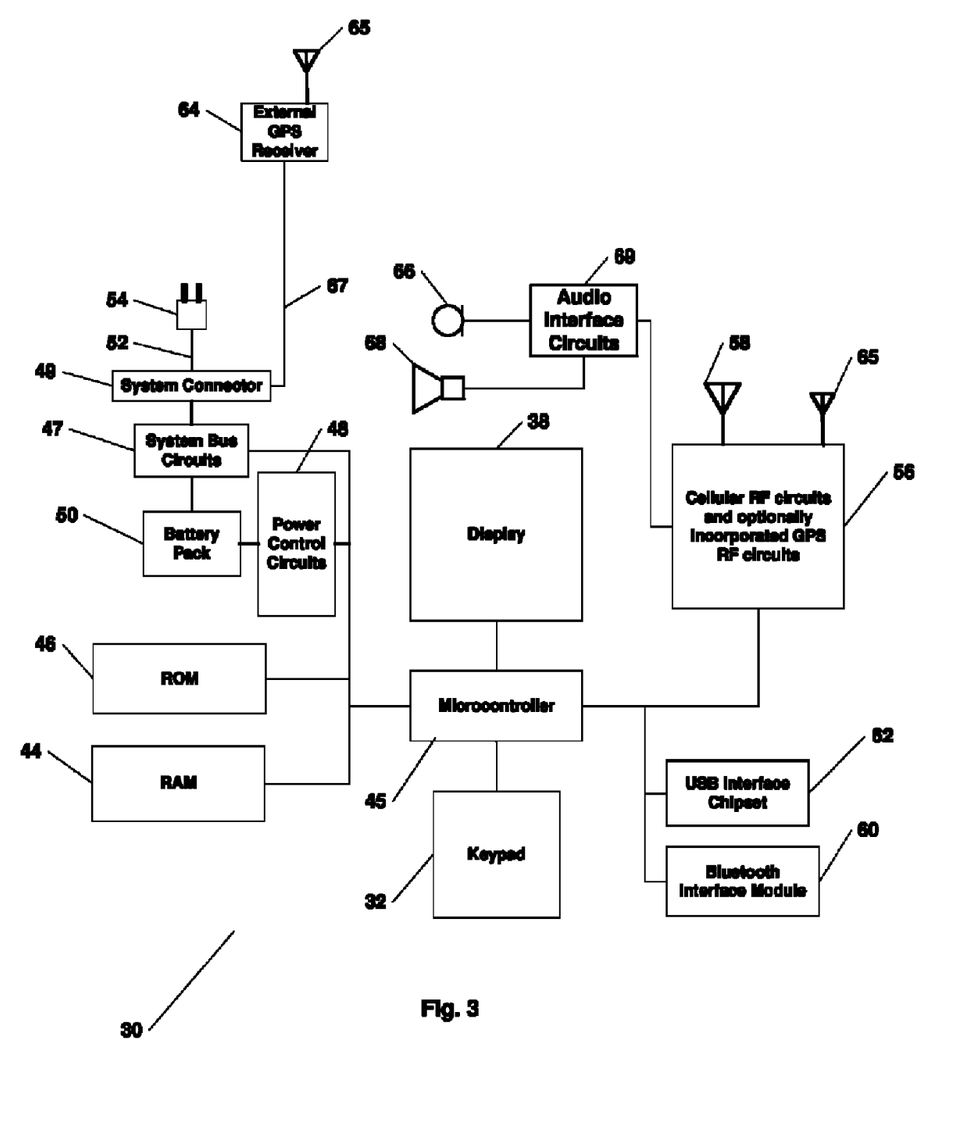
FIG. 3 is a block diagram of the essential components of the remote control unit of the system of FIG. 1.

Referring to FIG. 3, the cellular telephone 30 suitable as a remote control unit 12 or 26 includes a microcontroller 45 electrically interconnected with random access memory 44, read only memory 46, the keypad 32, and the LCD display 38. Power is supplied to the operational components by power control circuits 48 connected to rechargeable batteries 50. Wire 52 electrically interconnects charger 54 to system connector 49. Power from the system connector 49 is controlled through the system bus circuits 47 and microcontroller 45 to charge battery pack 50. The remote control unit 12 communicates with external devices through the cellular RF interface circuits 56 connected to an antenna 58, a Bluetooth module 60, a universal serial bus (USB) module 62 or through system connector 49 and system bus circuits 47. Cellular voice and data communications are transmitted to and received from the cellular telephone network 22 by the wireless cellular rf circuits 56 in a conventional manner. The Bluetooth data is received and transmitted by the Bluetooth module 60. Global satellite positioning information is received by either an external GPS module 64 or by an integrated GPS receiver incorporated into the cellular RF circuits 56. Data from the external GPS receiver 64 is communicated over serial interface cable 67 connected to system connector 49 and is then transferred to microcontroller 45 through the system bus circuits 47. Audio communications are received on the microphone 66 and are transmitted on the audio speaker 68 through audio interface circuits 69.

The custom JAVA/J2ME application software is transferred into the ROM 46 for access by the microcontroller 45. The application software can be downloaded into the ROM 46 by transmission from the cellular network 22 to the antenna 58 to the microcontroller 45, which stores the software therein. The application may also be downloaded by an external program device, such as a personal computer (not shown) by Bluetooth module 60, USB interface 62, or from the system connector 49. The RAM 44 provides service or scratchpad memory for computational use by microcontroller 45.

Figure 4:
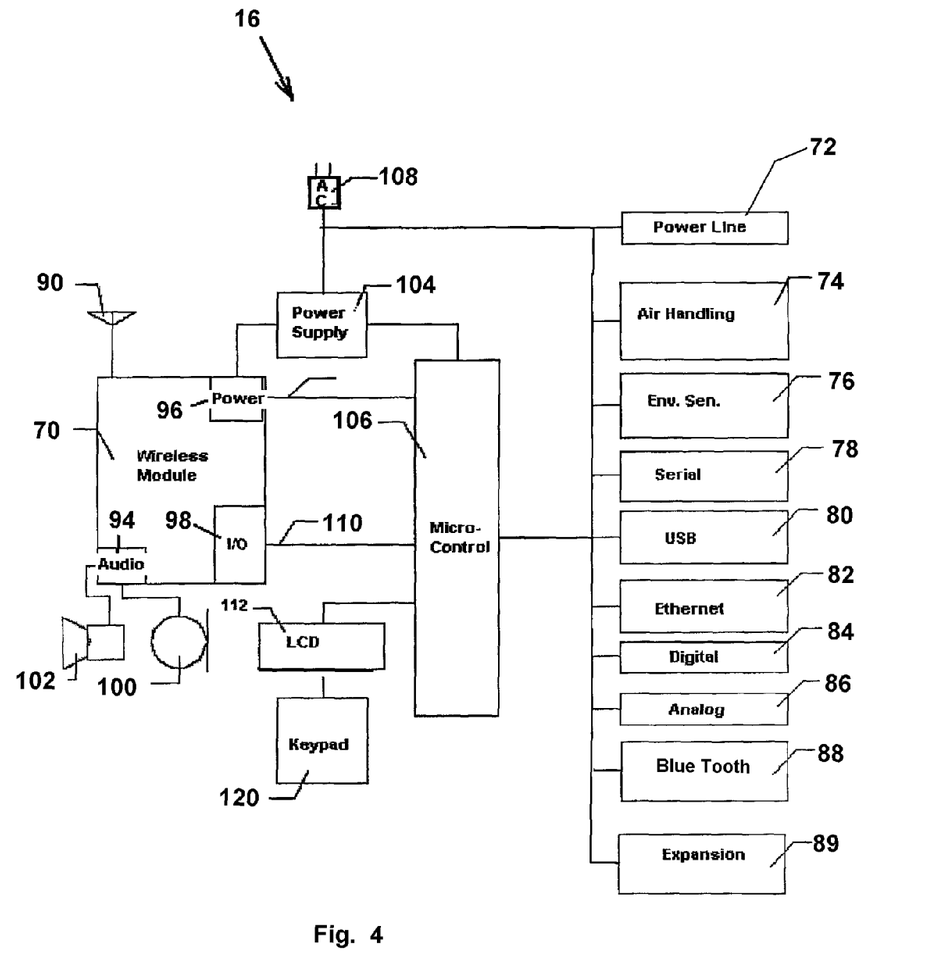
FIG. 4 is a block diagram of the base control unit of the system of FIG. 1.

Referring to FIG. 4, the base control unit 16 consists a wireless module 70 communicating with a microcontroller 106 for operating a number of separate subsystems. The microcontroller communicates with each of the subsystem components using either a serial or parallel communications bus depending upon the capabilities of the particular subsystem component.

The subsystems contained within the base control unit 16 consist of either off-the-shelf integrated circuits combined with discreet components or complete modules provided by other original equipment manufacturers (OEMs). As there are many different providers of components and modules, only one particular method of systems design and integration is described herein. Those skilled in the art will recognize that there are many ways to put together components and modules to achieve a design with similar features.

The base control unit 16 includes a plurality of communication interfaces 72, 74, 76, 78, 80, 82, 84 86 and 88 for providing the means for remote control and remote monitoring of the various subsystems within the residential environment. Remote monitoring and control can be achieved through either the wireless module 70 or the Ethernet interface 82. A multi-purpose expansion bus 89 is a proprietary bus providing a custom communications interface for accessories developed exclusively for use with the base control unit.

The base control unit 16 consists of an antenna 90 which is attached to the wireless interface module 70. The antenna connection may be made either directly through a connector incorporated as part of the antenna or through a coaxial cable so that the antenna 90 may be mounted at a location remote from the base control unit.

The wireless interface module 70 provides both voice and data communications capabilities to the base control unit 16 through audio interface 94, power interface 96 and I/O interface 98. A microphone 100 and a speaker 102 provide for voice communications to the user through the audio interface 94 of the wireless interface module 70. The power interface 96 provides power to the module 70 via power supply 104 and also allows a system microcontroller 106 to control the on/off state of the module. The power supply 104 is connected to the structure power supply through connector 108. The I/O interface 98 provides for a data pathway for digital communications over bus 110 as well as providing the means for the system microcontroller 106 to control the various communications aspects of the wireless module 70. Data communicated over bus 110 is RS232 ASCII or text "AT" commands commonly used in telephone modem instruction sets.

The user interacts with the base station through keypad 120 and LCD display 112 to the system microcontroller 106. Applications software embedded into the on-board ROM of the microcontroller 106 provides the functionality for interpreting the keypad 120 input and for displaying appropriate messages on the LCD display 112. Alternatively, the LCD display 112 may be of the well known touch pad design in which the keypad 120 functions are performed by pressing against predetermined screen areas that correspond to key designations. Further, the LCD Display 112 and keypad 120 may be eliminated completely with the base control unit 16 including web services that enable communication through one of the communications interfaces, such as the Ethernet 82 interface or the USB interface 80, to a connected personal computer equipped with a web browser or other communications software. The base control unit 16 is TCP/IP enabled, permitting its direct connection to a local area network or directly to the Internet. With this configuration, programming and customization of the applications software in the base control unit can be performed from anywhere in the world with an Internet connection.

The interfaces of the base control unit 16 provide for the control and the monitoring of a variety of subsystems within the residential environment as well as providing a means of expanding the functionality of the base station through the use of industry standard interface technologies including universal serial bus (USB) 80; the Ethernet (10/100/1000 Base-T) bus 82 and the RS-232 serial bus 78.

The interface 76, environmental sensor network, is implemented as a 1-Wire® network allowing for a number of various types of temperature, humidity, light-level and other sensors to be monitored by the base control unit 16. The 1-Wire® network is expandable to a wide array of devices including general purpose digital and analog I/O devices which would allow for the control of actuators and relays that may be useful for control of air dampers, water control valves, electronic windows, vents and other such devices utilized within a typical residential environment.

The interface 74, the air handling control systems interface, provides the means by which the base station serves to control the heating, air conditioning and other air handling equipment within the residence. This interface is designed to replace the standard thermostat that is typically used within residential heating and cooling systems. The interface 74 may provide multi-zone thermostat functions control as well as an interface to electronic air dampers. The thermostat portion of the base control unit is capable of controlling an unlimited number of zones.

The serial data bus interface 78 allows for data communications with the wide range of devices on the market that support this type of communications interface. Examples of such data communications include desk top computers, modems, and fax machines.

The USB interface 80 allows the base control unit 16 to communicate with other devices that support this type of interface. This bus can be used to expand the capabilities of the base station and add support for: persistent data storage; peripheral expansion devices (digital cameras etc); and other wireless interfaces (Bluetooth, 802.11).

The Digital Analog and I/O interfaces 84 and 86 respectively allow the base control unit to connect to a wide array of devices that interface to the real world. This allows the base control unit to serve as a bridge between simple devices and the networks to which the base station is connected. Examples of such would include: alarm systems; electronic locks; gate controls; pressure transducers; contact closures; and relays.

The multi-purpose expansion bus 89 is a proprietary bus that allows for the addition of custom accessories developed exclusively for use with the base station.

The power line interface 72 allows the base control unit to communicate over the power line to devices that support a power line communications interface. Examples of these type of interfaces are X10 and HomePlug.

The remote control units 12, 26 take advantage of either GPS Assisted ("GPSA") technology, an external GPS unit 64 or location based information provided by the cellular network 22. GPSA technology uses cellular-based location information provided by cellular infrastructure pursuant to the E911 protocol or mandate. With GPSA, cellular telephone towers locations have their own GPS receivers installed such that their coordinates are already known and can be readily communicated to the remote control units such that the normal three to five minute delay inherent in GPS position determination is avoided. For remote control units without GPSA technology, an external GPS can be used to communicate geographic location to the software within the remote control unit. The cellular carrier can further provide location based information to the cellular handset by using the cellular towers to determine its geographic location.

Each remote control unit 12, 26 communicates with the base control unit 16 to affect the operational aspects thereof and peripheral equipment operatively attached thereto. For example, a remote control unit can command the base control unit 16 to enter an energy conservation mode. The user moves the cursor of the LCD screen 38 until the desired operational icon 42 is highlighted. The function associated with the icon 42 by the applications software is triggered by pressing the select button 36. The applications software communicates the command to the base control unit 16 through the cellular telephone network 22. The command string so transmitted is received and processed by the base control unit 16. Upon entering this mode the base control unit 16 adjusts air handling systems, open or close dampers, open or close window coverings, and adjusts operation of a hot water heater to conserve power consumption of the home. In the preferred embodiment, the remote control units are conventional cellular telephone handsets that are equipped with a programming kernel, such as Java or J2ME that enables the telephone to be customized to perform functions that are not typical of standard cellular telephone operation. For example, to use a cellular telephone that has a home automation terminal in its conventional mode, the user would have to enter a telephone number, dial into a home automation controller, and press the telephone keys to send DTMF audio signals to the controller. After the session is completed, the user has to manually disconnect from the cellular network. The data path between the remote control unit and the base control unit is SMS ("simple message service".) However, the implemented port addressing scheme allows short messages to the remote control unit to bypass standard cellular telephone functions and to operate the features of the unit independently. The desired port to be addressed on the receiving unit is configured in the user data header of the SMS message that is transmitted to the receiving unit as is well known in the art. Further, the various remote control units can send SMS information to and from one another, exclusive of the base control unit in order to change the status information for a particular user. For example, if one remote control unit desires to be inactive, a command is sent to the other remote control unit to change the personal status thereof as displayed on the other units. Similarly, the remote control units can send SMS messages to the applications running in the other remote control units to affect operation parameters of those receiving remote control units.

By way of illustration, if the base control unit notifies the remote control unit of an activation of an alarm system associated with the base control unit, the remote control unit receives textual messages and graphical indicators to alert the user. The user acknowledges receipt of the alert by pressing a button or entering a code. The communication does not involve the voice mode for communicating between the two units. Use of a conventional programmable cellular telephone readily meets the regulatory requirement that a device that participates in the cellular network be FCC or CTIA approved.

SMS port addressing allows Mobile Terminated SMS messages to be processed within the cellular telephone's application software without user intervention. Such uses include Voice Mail notifications, Wireless Access Protocol WAP, E-mail, and Phone Provisioning. The Internet Assigned Numbers Authority (http://www.iana.com) is responsible for defining the use of the various ports and specific ranges of numbers have been assigned for use by application software.

When the Java software application is operationally accessed by microcontroller 45 and started within the remote control unit 12, it attaches itself to a specific port for the reception of SMS messages. All Mobile Terminated (MT) SMS messages that contain a User Data Header (UDH) that indicate a port address, such as 50120, will be forwarded to the application software for processing.

The following AT command sequence is illustrative of the commands the base station unit 16 sends to the wireless module 70 over serial communications interface 110 to send a message to the remote control unit 12 to notify it that the temperature in zone 0 is currently 72 degrees:

| | |
|---|---|
| ATE = 0\r | Turn off echoing of characters sent to the module |
| AT + CMGF = 0\r | Set Module in PDU Message format |
| AT + CMGS = 44\r | Total length of PDU is 44 octets |
| 0041000AC10294268088000023060504C3C800003C7AB90D 07E9DFEE724F041381EC6176BDDC13DD64A2970F <ctrl-Z> | |

The base control unit 16 is configured to interact with and respond to multiple remote control units 12. If multiple remote control units 12, or associate units 26 are deployed, one of the remote control units could be considered a master and all others could be considered slaves. Specific operational characteristics of the base control unit 16 may be configured as to only respond to commands from the master remote control unit. Alternatively, the remote control units may be segregated into classes such that the base control unit responds to commands and communicates selected information to a class containing one or more remote control units. An example would be a first class consisting of remote control units operated by parents and a second class consisting of remote control units operated by children. Information pertaining to the activities of the children may be selectively reported by the base control unit to the parents. By way of illustration, when a child operating a remote control unit in the second class disarms the alarm system prior to entering the residence controlled by the base control unit, parents in the parent class are notified accordingly that the child has arrived at home. The class assignments and configurations are easily customized to provide the notifications desired by the authoritative system operators, in this case, the parents.

The GPS receiver module 64 including antenna 65 is optionally incorporated into the remote control unit 12 for allowing the remote control unit to communicate position information to the base control unit 16. The GPS may also be incorporated into wireless module 56, as in newer CDMA 2000 compatible cellular modules. This feature allows the base control unit to change its operational characteristics based upon the location of the remote control unit(s).

For example, the base control unit may adjust the water temperature and thermostats when one of the remote control units comes within a specific distance from the house. The geographic information that is acquired by the GPS subsystem in the remote control unit (whether it is a separate GPS unit or part of the module) can be compared to settings stored in either the remote control unit itself or the base control unit to provide capabilities such as Geo-Fencing, Asset Tracking, and Bio-Location (knowing where a living entity is located).

In the preferred embodiment, the position data are derived from NEMA data received from the GPS component. NEMA data includes latitude, longitude, time, velocity, and heading information. Each information packet is streamed once per second. Data are captured by the remote control unit, they are processed by its application software, and the results are transmitted by port-addressed SMS to the base control unit for proximity detection. Specific remote control units can be configured in such a way that they send a status message to the base control unit if they exceed a programmed set of boundary conditions. If desired, the base control unit can on its own initiative query the remote control unit to learn its geographic location.

Geographic location information is programmed into the base control unit through keypad 120. Additionally, the geographic location of the base control unit may be entered into a GPS-enabled remote control unit through the application software user interface. A user-determined distance is then programmed into the remote control unit. When the remote control unit travels a distance that exceeds the programmed distance from the base control unit, the remote control unit reports this information to the base control unit. The base control unit will then send this information to the appropriate user or to a predetermined class of users. This is an example of geo-fencing and would be typically used to notify parents that one of their children has traveled beyond a set distance from the home.

The base control unit communicates status information to the remote control unit either on a periodic or event-driven basis. It can initiate communications based on its aggregated inputs, or it can respond to individual requests and commands received from the remote control unit.

Examples of events that could cause the base control unit to initiate a communications session with the remote control unit include fire or burglar alarm activation, HVAC or freezer temperature thresholds exceeded, equipment failures, an air filter change necessary, a change in the home state vector, (occupied, unoccupied) or a geographical boundary condition exceeded by of one of the other remote control units.

In addition to communicating status information to the remote control unit, the base control unit will, as programmed, initiate corrective action for the indicated event. For example, upon communicating an alarm activation message to a remote control unit, the base control unit, upon detecting the presence of an authorized user arriving at the local location, could disable the alarm system. Upon the detection of a member of an authorized class member, the base control unit can start the operation of the whirlpool bath in anticipation of the user's arrival, turn on specified interior and exterior lighting, or increase or decrease the thermostatic set point for the heater or air conditioner.

Yet additional geographical dependent operation or control may be provided by the inherent aspects of Bluetooth wireless technology presently available from a wide variety of professional and consumer electronic equipment manufacturers and vendors. Bluetooth radio-frequency protocol enabled devices allow totally wireless operation of devices such as computers, computer keyboards, printers, pointing devices, digital audio players, headphones, computer games, personal digital assistances, remote controls, and the like. Each Bluetooth device is characterized by one of three power classes: Class 1 is designed for long range (approximately 100 m) devices, with a maximum output power of 20 dBm; Class 2 is for ordinary range devices (approximately 10 m) devices, with a maximum output power of 4 dBm; and Class 3 is for short range devices (approximately 10 cm) devices, with a maximum output power of 0 dBm. Class 2 devices are used in the preferred embodiment as they provide a beneficially sized geographic range or fence around the local location to allow the system to provide presence detection functionality.

Each chipset in a Bluetooth enabled device has a unique serial or identification number. To enable the base control unit to recognize and respond to the presence of a Bluetooth enabled device, the device must be physically held within operable range of the control unit. The user instructs the control unit to request authorization from the Bluetooth device. An authorization code is manually entered into the base control unit and then into Bluetooth device. If the unique identification or serial number entered into each unit matches, it is stored and associated with the particular user or class of users, and the base control unit and the Bluetooth enable device are authenticated and are in communication with each other. At a periodic interval, the base control unit directs the Bluetooth master unit (located in the base control unit) to do a device discovery and report back the unique identification numbers it finds. If an identification number is not discovered, the user is assumed not within close proximity of the base control unit, which then reports the results to the designated class of users. If desired or necessary based on environmental circumstances, the Bluetooth receiver can be remotely located from the base control unit for controlled reception or to compensate for radio frequency coverage problems. The Bluetooth enabled device could be a cellular telephone, a watch, an MP3 player, a pendant, or any other Bluetooth equipped device compatible with current Bluetooth standards.

In the preferred embodiment, the Bluetooth enabled remote control unit may be programmed using Java J2ME to send a message to other remote control units when they detect a specific base station control units. This feature allows multiple base station control units in a large environment and the case that the remote control unit handles the notification.

While the preferred embodiment employs popular Bluetooth technology, it should be appreciated and understood that other presently available technologies, such as 802.11(x), or future technologies can be used in the same manner as Bluetooth. The base control and remote control units each contain application software that is readily modifiable to adapt to a new or different technology or protocol.

Application software within the systems microcontroller 106 provides for autonomous control that is either preprogrammed at the time of manufacture or customized by the end user of the base station for their specific needs. Examples of autonomous control include: shut down of the air handling system if a fire is detected, thereby the spread of smoke and the possibility of "fanning" the fire; adjusting of indoor temperature and humidity settings depending upon conditions and information such as outdoor environmental conditions such as temperature, humidity, sun load and wind, short-term weather forecasts, family schedule and activities, structure occupancy, context, location of users; shutdown of sensitive electronic components and subsystems in cases of severe weather, or failures in other subsystems; closing and opening of windows and/or window coverings to conserve energy; control of sprinkler systems based upon current weather conditions and weather forecasts. The application software includes a macro language interpreter to enable efficient end-user customization and future expansion to the system. A macro is a miniature computer program activated by a symbol, name, or key that represents a list of commands, actions, or keystrokes. A macro allows a local or remote user to enter a single character or word to perform a series of predetermined actions.

Base control unit 16 further comprises the Ethernet interface 82 to respond to external web services generally accessible through an Internet connection. For example, at present, weather services on the Internet can be queried using the SOAP protocol. The services respond with timely weather information, typically encoded in XML. The base control unit 16 understands and interprets that received information and responds according to instructions, including macros, programmed into its application software. Such capability allows the base control unit to take actions, like causing the sprinkler system to bypass its scheduled watering cycle should rain be forecast. Other information services allow other responses. A school system's notification that schools are being released early due to inclement weather conditions could cause the base control unit to notify the class containing the parental remote control users of the decision to afford the parent the opportunity to make transportation and custodial decisions with regard to their children in the schools. The application software is RSS-aware and is capable of receiving and responding accordingly to RSS feeds. RSS ("really simple syndication") is an efficient and popular web content syndication serial data format. Any information that can be broken down into discrete data items can be syndicated via RSS. Once information about each item is in RSS format, in the present invention, the base control unit examines the feed for changes and reacts to the changes in an appropriate way. The Ethernet bridge function is easily updated and expanded by an upload of revised application software to the base control unit.

Messages from the remote control unit 12 to the base control unit 16 do not need to rely on port addressing for processing. The base control unit 16 uses a cellular telephone module that does not contain a user interface. The processing of SMS messages is handled by the base control unit applications software.

The base control unit 16 commands the cellular module to send newly received SMS messages directly to the base control unit 16 over the serial port using unsolicited result codes. Upon receipt of a new message the cellular module sends the following:

+CMT:<length><CR><LF><pdu>

Where

<length> is the length of the <pdu> element

<CR> is carriage return and <LF> is line feed.

<pdu> is the Short Message data in either PDU or text format. The base control unit 16 processes the data according the content of the message data.

Although port addressing is not currently used when messages are sent from the remote control unit 12 to the base control unit 16 software (it still is used within the base control unit 16 cellular module for provisioning and control from the carriers), the system can utilize the port addressing to direct messages to specific subsystems that are tied to the base control unit 16.

The present invention thus provides an on-demand bidirectional communications interface for monitoring, controlling, and securing various environment functions and characteristics attendant the interior and exterior of a building. The system may thus monitor and control temperature, and a myriad of other environmental functions of the building include, by way of example and not limitation, temperature, power status for the building and discrete applications therein, humidity/moisture, smoke/toxic gases, structural breaches, security status, visual conditions and a host of other natural and non-natural phenomena.

The base control unit is preferably mounted at an appropriate location on a wall within the building to provide a local access for regulation. The base control unit is locally operatively interfaced with a plurality of sensors and devices systematically distributed throughout the building and communicating according to varying protocols such as infrared, radio frequency, X-10, and hard wiring.

The sensors provide continuous measurement and status of target environmental characteristics. Examples of sensor applications include utilities status, moisture and humidity detection, door and window condition, and the like. Associated controlled devices providing operational functions refrigeration, water heating, security cameras, illumination devices, and the like.

The air handling unit receives signals from the associated sensors and communicates them to the base control unit 16 that, based on the processed measured characteristics thereof, activates or deactivates one or more of the devices of the unit in response to the measurement. For example, if the temperature sensor exceeds a preset value, the HVAC unit is activated, and when the measured characteristic is within a preset value range, the unit is deactivated. In addition, when a measured characteristic exceeds a predetermined value range, an alarm signal may be transmitted to a remote control unit 14 to provide an audible, tactile, and/or visual indication. Thus, if utility sensor S2 indicates a loss of electrical, water, or communications service, a signal is sent to the remote control unit 14 and the operator thereof has the ability to take corrective action in response thereto. Also, the operator may invoke the a command from the remote control unit 14 to the base control unit 16 to activate a select device such as the HVAC unit, a water heater, a refrigeration appliance or other discrete device remotely in order to prepare the building for occupancy by the operator or designee.

The sensors for the system are distributed throughout the building to detect the environmental characteristics of the building. These characteristics include, but are not limited to, temperature, humidity/moisture, smoke/toxic gases, structural breaches, and a host of other natural and non-natural phenomena.

In a conventional thermostat, a temperature sensor and switch automatically control a heating or cooling appliance when the sensed temperature is beyond a preset value. The thermostatic interface of the invention would include a temperature sensor that constantly monitors the environmental temperature and control of a heating and/or cooling appliance to maintain the building at a substantially constant temperature.

The thermostatic interface also receives other environmental characteristics of the building and responds in a like manner. For example, a sensor would monitor the humidity (or moisture content of the air) of the building. If the temperature monitored by temperature sensor is within the preset range value, a conventional thermostat would not adjust the heating and/or cooling appliance to regulate the moisture content, thus presenting favorable environment for the growth on molds and mildew. The thermostatic interface receives the humidity value measured by the humidity sensor, determines that the value exceeds a predefined limit, and generates an alarm signal that is transmitted as an alarm signal via the communication link to the remote control unit. The operator receives the information and transmits a control signal from the remote access unit to the base control unit via the communication link and activates the appropriate appliance in response thereto, thus reducing the humidity value to acceptable levels and preventing the progression of mold and mildew growth.

The sensors are distributed according to a predetermined plan that effectively makes the "most likely place" for a change in environmental characteristics to be sensed. For example, several smoke/toxic gas sensors would be distributed about the ceilings and floors so as to identify the presence of smoke (i.e. fire) or carbon monoxide (i.e. toxic gas), and relaying the measured characteristic to the thermostat. Other types of sensors would be optimally placed in order to monitor the egression of water into the building, lighting striking the building, suspension or cessation of a provided utility (i.e., electric power, water and sewerprovisions, natural gas), collapse of the building or a portion thereof due to weather (i.e., tornado, hurricane, blizzard), or breach of the building security (i.e., break-ins). The sensors may be hard wired through the structure of the building. Also, the sensors may have a wireless communication. The optimal presentation would be a dual connection, such a hard-wired and wireless communication, e.g., a transmitter/receiver. This provides maximum effective monitoring of the building because the hard wiring would alleviate the need for constant battery monitoring, likewise, the wireless communication provides monitoring should the absence of electrical power be a factor. For example, the combined hard wired and wireless connection of the sensors to the unit allows the monitoring of the building and generates the alarm when the power is lost due to an area wide electrical outage. The unit transmits that information (i.e., the loss of electrical power) to the remote control unit and the operator is aware that the electrical power is absent. If the loss of electrical power were due to a nefarious figure seeking to breach the building, i.e., breaking a window to gain access, a security sensor would still be able to provide the base control unit with an indication that the building has a security breach. The base control unit, operating under an alternate electrical power supply such as a backup battery, would generate a subsequent alarm signal and transmit the subsequent alarm signal for routing through the direct connect wireless for immediate transmission to the remote control unit, thereby alerting the operator that in addition to the loss of electrical power, the security of the building has been breached. The operator can thereby contact the law enforcement facility of the local jurisdiction and have an immediate response. If the remote control units are organized in classes, such as "managers", the information would be almost simultaneously provided to each member of the class who would have a need to receive and react to it.

In addition to main residence use, the system is typically suited for a vacation/second dwelling, a business concern, or any building structure that is not constantly occupied. For example, if the thermostat control system is installed in a vacation home in one locality, the operator may effectively be in any other portion of the globe so long as an effective communication link is provided with the remote control unit 14.

Multiple base station units could be controlled through a single cellular phone for those instances where a person desires to have systems installed in multiple residences. The application software uses the Source Address field of the message to distinguish between different base control units 16.

It is to be understood that the present invention is not limited to the embodiments described above, but encompasses any and all embodiments within the scope of the following claims.

What is claimed is:

1. A wireless system comprising:
    an environmental device;
    a base unit operatively interfaced with the environmental device and configured to control an operation of the environmental device;
    a remote unit having wireless connectivity and being configured to send and receive short message service (SMS) messages; and
    a wireless module operatively interfaced with the base unit and configured to provide wireless connectivity between the base unit and the remote unit,
    wherein the base unit is configured to send a first SMS message, including current environmental information, to the remote unit through the wireless module,
    wherein the remote unit is configured to send a second SMS message, including a command for the environmental device, to the base unit through the wireless module, and
    wherein the base unit is configured to receive the second SMS message, including the command, and to send the command to the environmental device to control the operation of the environmental device.

2. The system as recited in claim 1 wherein said environmental device includes electronic and electromechanical switching portions interfaced with said environmental device.

3. The system as recited in claim 1 wherein said base unit is a microcontroller-based processing unit having customizable application specific software.

4. The system as recited in claim 1 wherein said remote unit is a cellular telephone handset with custom programmability.

5. The system as recited in claim 4 wherein said custom programmability is a JAVA programming kernel.

6. The system as recited in claim 4 wherein said custom programmability is a J2ME programming kernel.

7. The system as recited in claim 1 wherein said wireless connectivity includes a transmitting and receiving module in said base unit and a transmitting and receiving unit in said remote unit operatively communicating with each other over a cellular telephone network.

8. The system as recited in claim 1 wherein the remote unit includes a liquid crystal display module.

9. The system as recited in claim 8 wherein said liquid crystal module includes selectable graphic icons corresponding to current environmental information being monitored or controlled.

10. The system as recited in claim 1, wherein the remote unit is configured to selectively disable transmission of SMS messages from the base unit.

11. A wireless system comprising:
    an environmental device configured to send environmental information, and adapted to receive a command to control an operation of the environmental device;
    a remote unit having wireless connectivity and being configured to:
        receive a first short message service (SMS) message, wherein the first SMS message includes the environmental information;
        notify a user of said remote unit of receipt of the first SMS message; and
        send a second SMS message, wherein the second SMS message includes the command; and
    a wireless base unit configured to:
        receive the environmental information from the environmental device;
        transmit the first SMS message to the remote unit;
        receive the second SMS message from the remote unit; and
        send the command to the environmental device.

12. The system of claim 11 wherein the wireless connectivity connection further comprises a first wireless connection interfacing with the base unit, a second wireless connection interfacing with the remote unit, and a non-wireless connection interfacing between the first wireless connection and the second wireless connection.

13. The system of claim 11 wherein the environmental device includes electronic and electromechanical switching portions for controlling the environmental information.

14. The system of claim 11 wherein the base unit further comprises a microcontroller-based processing unit having customizable application specific software.

15. The system of claim 11 wherein the remote unit further comprises a cellular telephone handset.

16. The system of claim 15 wherein the cellular telephone handset includes at least one of a customizable JAVA programming kernel and a customizable J2ME programming kernel.

17. The system of claim 11 further comprising a cellular telephone network.

18. A base unit configured to communicate with an environmental device and to communicate with a remote unit having wireless connectivity, the base unit comprising:
    a communication interface configured to receive environmental information from the environmental device and to send a command to the environmental device;
    a wireless module configured to send a first message to the remote unit and to receive a second message from the remote unit, wherein the first message is a first short message service (SMS) message including the environmental information, and wherein the second message is a second short message service (SMS) message including the command to the environmental device; and a microcontroller configured to process the second message including the command, and to send the command through the communication interface to the environmental device.

19. A communication system having wireless connectivity, the communication system comprising:

a base unit operatively interfaced with an environmental device, and configured to receive a current status of an environmental device;

a transmitter associated with said base unit, and configured to send a first message to a remote unit having wireless connectivity, wherein the first message is a wireless message including the current status of the environmental device;

a receiver associated with said base unit, and configured to receive a second message from the remote unit, wherein the second message is a wireless message including a command for the environmental device; and a controller operatively associated with the base unit and operatively connected with the environmental device, and configured to send the command to the environmental device.

20. A wireless system comprising:

a base unit operatively interfaced with an environmental device for controlling an environmental condition in a structure;

a receiver associated with said base unit, and adapted for receiving a first wireless message from a remote unit having wireless connectivity, wherein the first wireless message includes a command for the environmental device;

a controller operatively associated with said base unit, and operatively connected with the environmental device for executing the command; and a transmitter operatively associated with the controller for sending a second wireless message to the remote unit, wherein the second wireless message includes information indicating that the command has been executed.

21. A base unit configured to communicate with an environmental device and to communicate with a remote unit having wireless connectivity, the base unit comprising:

a communication interface configured to receive environmental information from the environmental device and to send a command to the environmental device;

a wireless module configured to send a first message to the remote unit and to receive a second message from the remote unit, wherein the first message includes the environmental information and travels via short message and/or data bearer services, and wherein the second message includes the command to the environmental device and travels via short message and/or data bearer services; and a microcontroller configured to process the second message including the command, and to send the command through the communication interface to the environmental device.

22. A base unit configured to communicate with an environmental device and to communicate with a remote unit having wireless connectivity, the base unit comprising:

a controller configured to communicate with the environmental device; and a wireless module configured to:
 receive a control message from the remote unit via short message and/or data bearer services, said control message comprising control information for controlling the environmental device;
 create a control command for the environmental device based on the control information;
 send the control command to the environmental device via the controller; and
 send a status message indicating execution of said control information to the remote device.

* * * * *